United States Patent
Beck et al.

(10) Patent No.: US 11,805,541 B2
(45) Date of Patent: Oct. 31, 2023

(54) METHODS AND SYSTEMS FOR PROVISIONING OF PARAMETER DATA OF RADIOS CONTROLLED BY A SPECTRUM ACCESS SYSTEM

(71) Applicant: CommScope Technologies LLC, Hickory, NC (US)

(72) Inventors: Andrew E. Beck, Ashburn, VA (US); Sammit Patel, Dallas, TX (US); Shirley M. Forsythe, Sachse, TX (US)

(73) Assignee: CommScope Technologies LLC, Hickory, NC (US)

( * ) Notice: Subject to any disclaimer, the term of this patent is extended or adjusted under 35 U.S.C. 154(b) by 163 days.

(21) Appl. No.: 17/329,593

(22) Filed: May 25, 2021

(65) Prior Publication Data

US 2021/0400680 A1 Dec. 23, 2021

Related U.S. Application Data (60) Provisional application No. 63/040,094, filed on Jun. 17, 2020.

(51) Int. Cl.
| | | |
|---|---|---|
| H04W 16/14 | (2009.01) | |
| H04W 72/56 | (2023.01) | |
| G06F 21/60 | (2013.01) | |

(52) U.S. Cl.
CPC .......... *H04W 72/56* (2023.01); *G06F 21/602* (2013.01); *H04W 16/14* (2013.01)

(58) Field of Classification Search
CPC ..... H04W 72/10; H04W 72/56; H04W 16/14; G06F 21/60; G06F 21/602
See application file for complete search history.

(56) References Cited

U.S. PATENT DOCUMENTS

| | | |
|---|---|---|
| 1,011,642 A | 12/1911 | Patterson |
| 6,008,808 A | 12/1999 | Almeida et al. |
| 6,317,599 B1 | 11/2001 | Rappaport et al. |
| 6,470,195 B1 | 10/2002 | Meyer |
| 6,771,966 B1 | 8/2004 | Chow |
| 7,777,480 B2 | 8/2010 | Wolfe |
| 8,018,390 B2 | 9/2011 | Davidson et al. |
| 8,150,413 B2 | 4/2012 | Aoyama et al. |
| 10,116,452 B2 | 10/2018 | Giladi et al. |
| 10,396,426 B2 | 8/2019 | Michaelis et al. |

(Continued)

FOREIGN PATENT DOCUMENTS

| | | |
|---|---|---|
| JP | 4819303 B2 | 11/2011 |
| WO | 2012036640 A1 | 3/2012 |

(Continued)

OTHER PUBLICATIONS

Document WINNF-TS-0112, Version V1.9.1, Mar. 11, 2020 (Year: 2020).*

(Continued)

*Primary Examiner* — Will W Lin
(74) *Attorney, Agent, or Firm* — Fogg & Powers LLC (57) ABSTRACT

Techniques for automating delivery of data of a radio to a spectrum access system are provided. The data is used by the spectrum access system to use the data to control transmission of the radio to regulate interference in shared spectrum at an incumbent or primary user, where the radio is that of a secondary user.

17 Claims, 3 Drawing Sheets

(56) References Cited

U.S. PATENT DOCUMENTS

| | | | |
|---|---|---|---|
| 10,536,859 | B2 | 1/2020 | Gunasekara et al. |
| 10,681,560 | B1* | 6/2020 | Sevindik ............... H04W 16/14 |
| 2003/0076791 | A1 | 4/2003 | Sawabe et al. |
| 2004/0208547 | A1 | 10/2004 | Sabat et al. |
| 2004/0259555 | A1 | 12/2004 | Rappaport et al. |
| 2005/0192015 | A1 | 9/2005 | Abusch-Magder et al. |
| 2006/0019679 | A1 | 1/2006 | Rappaport et al. |
| 2007/0064784 | A1 | 3/2007 | Dehghan et al. |
| 2007/0106717 | A1 | 5/2007 | Dundar et al. |
| 2007/0147248 | A1 | 6/2007 | Kodialam et al. |
| 2008/0180227 | A1 | 7/2008 | Le et al. |
| 2010/0056163 | A1 | 3/2010 | Schmidt et al. |
| 2010/0157846 | A1 | 6/2010 | Cooper et al. |
| 2010/0285788 | A1 | 11/2010 | Epifani et al. |
| 2011/0237246 | A1 | 9/2011 | Sen |
| 2012/0002557 | A1 | 1/2012 | Sedlar et al. |
| 2013/0188500 | A1 | 7/2013 | He et al. |
| 2013/0259110 | A1 | 10/2013 | Peric et al. |
| 2013/0281063 | A1 | 10/2013 | Jactat et al. |
| 2013/0331114 | A1 | 12/2013 | Gormley et al. |
| 2014/0068034 | A1 | 3/2014 | Tapia |
| 2015/0215949 | A1 | 7/2015 | Gormley et al. |
| 2015/0296386 | A1 | 10/2015 | Menon et al. |
| 2015/0350923 | A1 | 12/2015 | Wang et al. |
| 2016/0087849 | A1 | 3/2016 | Balasubramanian et al. |
| 2016/0277901 | A1 | 9/2016 | Mitchell et al. |
| 2017/0055268 | A1 | 2/2017 | Aksu |
| 2017/0078492 | A1 | 3/2017 | Schmidt et al. |
| 2017/0188241 | A1 | 6/2017 | Mueck et al. |
| 2017/0188314 | A1* | 6/2017 | Mueck ................ H04W 24/02 |
| 2017/0295497 | A1 | 10/2017 | Macmullan et al. |
| 2017/0332243 | A1 | 11/2017 | Macmullen et al. |
| 2017/0357010 | A1 | 12/2017 | Vella-Coleiro et al. |
| 2018/0279316 | A1 | 9/2018 | Mueck et al. |
| 2018/0332660 | A1* | 11/2018 | Mueck ................ H04W 48/10 |
| 2019/0028182 | A1 | 1/2019 | Smyth et al. |
| 2019/0045367 | A1* | 2/2019 | Mueck ................ H04W 72/04 |
| 2019/0191314 | A1* | 6/2019 | Mueck ................ H04W 16/06 |
| 2019/0215058 | A1 | 7/2019 | Smyth et al. |
| 2019/0215698 | A1 | 7/2019 | Balachandran et al. |
| 2019/0289659 | A1* | 9/2019 | Sawai ................ H04W 16/14 |
| 2020/0359229 | A1* | 11/2020 | Macmullan ....... H04W 72/0453 |
| 2021/0022011 | A1* | 1/2021 | Furuichi ............. H04W 16/14 |

FOREIGN PATENT DOCUMENTS

| | | | |
|---|---|---|---|
| WO | 2015197537 | A1 | 12/2015 |
| WO | 2017065852 | A1 | 4/2017 |
| WO | 2018072367 | A1 | 4/2018 |
| WO | 2019027616 | A1 | 2/2019 |
| WO | 2019143511 | A1 | 7/2019 |

OTHER PUBLICATIONS

H. Li, Y. Dou, C. Lu, D. Zabransky, Y. Yang and J. -M. J. Park, "Preserving the Incumbent Users' Location Privacy in the 3.5 GHz Band," 2018 IEEE International Symposium on Dynamic Spectrum Access Networks (DySPAN), 2018, pp. 1-10, doi: 10.1109/DySPAN.2018.8610470 (Year: 2018).*

International Searching Authority, "International Search Report and Written Opinion from PCT Application No. PCT/US2021/034005", from Foreign Counterpart to U.S. Appl. No. 17/329,593, dated Sep. 3, 2021, pp. 1 through 11, Published: WO.

AISG, "Control interface for antenna line devices", Antenna Interface Standards Group Standard No. AISG v2.0, Protocol Specification AISG v2.0 Draft 4,, Jun. 13, 2006, pp. 1 through 41, AISG Ltd.

Code of Federal Regulations, "Part 96—Citizens Broadband Radio Service", Title 47: Telecommunication—Chapter I—Subshpater D—Part 96, Apr. 24, 2020, pp. 1 through 19, Electronic Code of Federal Regulations.

CommScope, "Product Specifications, APS-XT", Apr. 16, 2018, pp. 1, CommScope, Inc.

European Patent Office, "Extended European Search Report from EP Application No. 18832301.8", from Foreign Counterpart to U.S. Appl. No. 15/989,026, dated Jan. 27, 2021, pp. 1 through 13, Published: EP.

International Bureau, "International Preliminary Report on Patentability from PCT Application No. PCT/US2018/034472", from Foreign Counterpart to U.S. Appl. No. 15/989,026, dated Jan. 23, 2020, pp. 1-7, Published: WO.

International Searching Authority; "Notification of Transmittal of the International Search Report and the Written Opinion of the International Searching Authority, or the Declaration, from PCT Application No. PCT/US2018/034472, dated Oct. 25, 2018"; from Foreign Counterpart of U.S. Appl. No. 15/989,026; pp. 1-10; dated Oct. 25, 2018; Published: KR.

U.S. Patent and Trademark Office, "Advisory Action", U.S. Appl. No. 15/989,026, dated Nov. 12, 2020, pp. 1 through 2, Published: US.

U.S. Patent and Trademark Office, "Final Office Action", U.S. Appl. No. 15/989,026, dated Aug. 7, 2020, pp. 1 through 14, Published: US.

U.S. Patent and Trademark Office, "Office Action", U.S. Appl. No. 15/989,026, dated Feb. 21, 2020, pp. 1-13, Published: US.

U.S. Patent and Trademark Office, "Office Action", U.S. Appl. No. 15/989,026, dated Mar. 18, 2021, pp. 1 through 13, Published: US.

Wireless Innovation Forum, "CBRS Certified Professional Installer Accreditation Technical Specification", Document WINNF-TS-0247 Version V1.4.0, Apr. 2, 2020, pp. 1 through 19, The Software Defined Radio Forum Inc.

Wireless Innovation Forum, "Requirements for Commercial Operation in the U.S. 3550-3700 MHz Citizens Broadband Radio Service Band", Document WINNF-TS-0112 Version V1.6.0, Oct. 30, 2018, pp. 1 through 80, The Software Defined Radio Forum Inc.

Wireless Innovation Forum, "Signaling Protocols and Procedures for Citizens Broadband Radio Service (CBRS): Spectrum Access System (SAS)—Citizens Broadband Radio Service Device (CBSD) Interface Technical Specification", Document WINNF-TS-0016 Version 1.2.3, Oct. 31, 2018, pp. 1 through 60, The Software Defined Radio Forum Inc.

Wireless Innovation Forum, "Test and Certification for Citizens Broadband Radio Service (CBRS); Conformance and Performance Test Technical Specification; SAS as Unit Under Test (UUT)", Document WINNF-TS-0061 Version V1.5.1, Oct. 7, 2019, pp. 1 through 196, The Software Defined Radio Inc.

International Bureau, "International Preliminary Report on Patentability", from PCT Application No. PCT/US2021/034005, from Foreign Counterpart to U.S. Appl. No. 17/329,593, dated Dec. 29, 2022, pp. 1 through 7, Published: WO.

* cited by examiner

METHODS AND SYSTEMS FOR PROVISIONING OF PARAMETER DATA OF RADIOS CONTROLLED BY A SPECTRUM ACCESS SYSTEM

CROSS-REFERENCE TO RELATED APPLICATIONS

The present application claims benefit of U.S. Patent Application Ser. No. 63/040,094, filed Jun. 17, 2020; the entire contents of the aforementioned patent application are incorporated herein by reference as if set forth in its entirety.

BACKGROUND

A citizens band radio service (CBRS) includes incumbent users of shared spectrum and secondary users of shared spectrum. An incumbent user may also be referred to as a primary user. Incumbent users have priority access to transmit in the spectrum shared with the secondary users. If an incumbent user requires access to transmit in shared spectrum, all or some of the secondary users proximate to the incumbent user must cease transmission or reduce transmission power so that aggregate interference in the shared spectrum is not greater than a threshold level. The power levels of secondary users may also be modified, e.g., reduced to diminish interference to other secondary users operating in the shared spectrum. Such secondary users use citizen broadband radio device(s) (CBSD(s)). A CBSD is a radio including a transmitter, e.g., an access point or base station.

A CBRS includes a spectrum access system (SAS) which regulates the transmissions by CBSD(s), e.g., whether each CBSD of a SAS can transmit, if so then at what power level and/or frequency, and whether a transmission must cease so that interference to an incumbent user operating in shared spectrum does not exceed a threshold level. To determine the foregoing, certain parameter data of each CBSD (or CBSD parameter data) of the SAS must be known by the SAS to regulate interference to an incumbent user and amongst CBSDs.

An installer typically measures data of some of the CBSD parameters. Further, the installer enters the CBSD parameter data so that it can be submitted to the SAS.

SUMMARY OF THE INVENTION

A program product is provided. The program product comprises a non-transitory processor readable medium on which program instructions are embodied, wherein the program instructions are configured, when executed by at least one programmable processor, to cause the at least one programmable processor to: receive a first set of data from at least one of: at least one sensor of a radio and at least one data storage device of the radio, wherein the received first of data comprises radio parameter data corresponding to the radio, and wherein the received first set of data is automatically received or is received upon request; receive a second set of data from a source other than the radio to which the additional radio parameters correspond, wherein the received second set of data comprises additional radio parameter data corresponding to the radio; and transmit a third set of data to at least one of: (a) the radio to which the radio parameter data corresponds and (b) spectrum access system circuitry, wherein the third set comprises at least one of: at least a portion of the first set and at least a portion of the second set, wherein upon being transmitted to the radio, the third set is configured to be subsequently transmitted to the spectrum access system circuitry configured to use the transmitted radio parameter data to control transmission of the radio to regulate interference in shared spectrum at an incumbent user which has priority in the shared spectrum over the radio.

Another program product is provided. The other program product comprises a non-transitory processor readable medium on which program instructions are embodied, wherein the program instructions are configured, when executed by at least one programmable processor, to cause the at least one programmable processor to: receive, at a spectrum access system, a set of data, wherein at least a first portion of the set of data is at least one of: (a) received from and (b) derived from data received from at least one of (i) at least one sensor of a radio and (ii) at least one data storage device of the radio, wherein the received set of data comprises radio parameter data corresponding to the radio, and wherein at least one of the received set of data (x) is automatically received and (y) is received upon request of the spectrum access system; and use, at a spectrum access system, the at least a first portion of the received set of data to control transmission of the radio to regulate interference in shared spectrum at an incumbent user which has priority in the shared spectrum over the radio.

DETAILED DESCRIPTION

Techniques are provided for collecting of certain data, e.g., CBSD parameter data and data which can be transformed into CBSD parameter data. Such CBSD data is configured to be transmitted to a SAS to determine the transmission characteristics (e.g., transmission power and/or frequency) of the corresponding CBSD and other CBSDs controlled by the SAS. Using CBSD parameter data from radios controlled by the SAS, the SAS is configured to control transmission of such CBSDs to regulate interference in shared spectrum amongst CBSDs controlled by the SAS and/or to incumbent user(s). Transmission of certain CBSD(s) may be terminated by the SAS when an incumbent user is subject to an impermissible level of interference by CBSDs (controlled by the SAS) in spectra shared with the incumbent user and CBSD(s). Further, the SAS allocates spectrum and maximum transmit power to CBSD(s).

Collection of data from sensors and/or data storage devices to obtain CBSD parameter data reduces measurement and data entry workload of an installer of the corresponding CBSD and diminishes the likelihood of errors in such CBSD parameter data, e.g., arising due to measurement and/or data entry error(s) by the installer. Optionally, the installer or another person or system may review and revise some or all of the collected data (including collected data that is CBSD parameter data and/or collected data configured to be transformed into CBSD parameter data) and/or CBSD parameter data transformed from the collected data.

A CBRS comprises general authorized access (GAA) and/or priority access license (PAL) CBSDs, and incumbent users. The higher priority users, such as government users for example radar systems, e.g., on ships, have priority access to certain spectrum in the shared spectrum. A SAS grants the CBSDs access to the shared spectrum, including assigning frequency spectrum (or channels) and optionally maximum transmission power. A SAS controls the transmission of GAA CBSDs so that PAL CBSDs and the higher priority users are free of interference from GAA CBSDs. The GAA and PAL CBSDs are secondary users; the PAL CBSDs are secondary users because they have lower priority than higher priority users (i.e., incumbent users) such as naval vessels. The SAS also controls the transmission of PAL CBSDs so that higher priority users are free of interference from PAL CBSDs.

Free of interference as used herein does not mean an absence of interference, but rather means an acceptable level of interference which may be no interference or a finite level of interference. The acceptable level of interference may vary by geography, frequency spectrum, user type, license type, and/or other indicia.

GAA CBSDs may be of two types: category A (low transmission power) and category B (high transmission power). Category A has a maximum transmission power spectral density of 30 dBm/10 MHz. Category B has a maximum transmission power spectral density of 47 dBm/ 10 MHz.

Incumbent users of shared spectrum have first, or highest, priority to utilize the shared spectrum controlled by the SAS. Thus, incumbent users (e.g., the receivers of incumbent users' communications systems or radios) shall be able to operate free of interference from other users, e.g., communications systems of priority access licensees and general authorized access users. In one embodiment, the incumbent users include government entities operating systems such as communications systems, operators of fixed satellite communications systems, and grandfathered, prior licensees of the frequency spectrum. Communications systems, as used herein, shall include radar systems (or radars).

In one embodiment, PAL users have second (or intermediate) priority, after incumbent users, to utilize the frequency spectrum controlled by the SAS. In another embodiment, a PAL user shall be able to operate, when incumbent users are free of interference of such a PAL user, and free of interference from other PAL users and general authorized access users. In one embodiment, an ability of a PAL user to operate free of interference shall be limited temporally, geographically, and spectrally within the specifications of its license.

GAA users have third, or lowest, priority to utilize the frequency spectrum controlled by the SAS. In one embodiment, an operation of GAA users will be governed by laws, regulations, and/or rules (e.g., pertaining to CBRS). Such laws, regulations, and/or rules may be established by government(s) and/or standards bodies (e.g., WInnForum). For example, such rules shall only let GAA users' CBSDs operate when they do not interfere with communication systems of incumbent and PAL users.

In one embodiment, the geographic coverage area proximate to (e.g., covered by radio frequency emissions of) the CBSD may include exclusion zones and protection regions (including location(s) of fixed satellite service(s) (FSS(s)), priority access license (PAL) protection area(s) (PPA(s)), grandfathered wireless protection zone(s) (GWPZ(s)), DPA(s), and receiver system(s) of environmental sensing capability (ESC) system(s)). CBSDs are prohibited from operating in specific frequency spectrum in exclusion zones. Further, the level of interference generated by, e.g., by all non-government users and even some government users (including incumbent, PAL, and GAA users) shall be limited in a protection region so as not to interfere with certain incumbent user(s)' communications systems, for example radar on naval vessels, intended to be protected by the protection region. CBSDs may only operate with the permission of the SAS when an incumbent user's communication system is operating in a protection zone. In some cases, this operation will be based upon information received by an environmental sensing capability (ESC) system, from external database(s), notification from an incumbent user, and/or from a beacon. One type of protection region is the grandfathered wireless protection zone which is a geographic area and/or frequency spectrum where grandfathered wireless broadband licensees can operate free of interference, e.g., of CBSDs. The foregoing are examples of exclusion zones and protection regions; other type of exclusion and protection regions may occur.

Although the invention is applicable to and is exemplified in the context of CBRS for pedagogical purposes, it applies to other shared spectrum systems, such as licensed spectrum access systems. The invention will be subsequently described in more general terms, e.g., using the term radio rather than CBSD, and shared spectrum system rather than CBRS. However, the terms CBRS and CBSD may be subsequently used when illustrating such system and device, or their specifications. Thus, CBSD parameter(s) and CBSD parameter data may be more generally referred to respectively as radio parameter(s) and radio parameter data. Radio parameter data means data for one or more radio parameters. Also, radio means a radio comprising a transmitter controlled by a spectrum access system. Unless otherwise specified herein, power means power or power spectral density.

Figure 1:
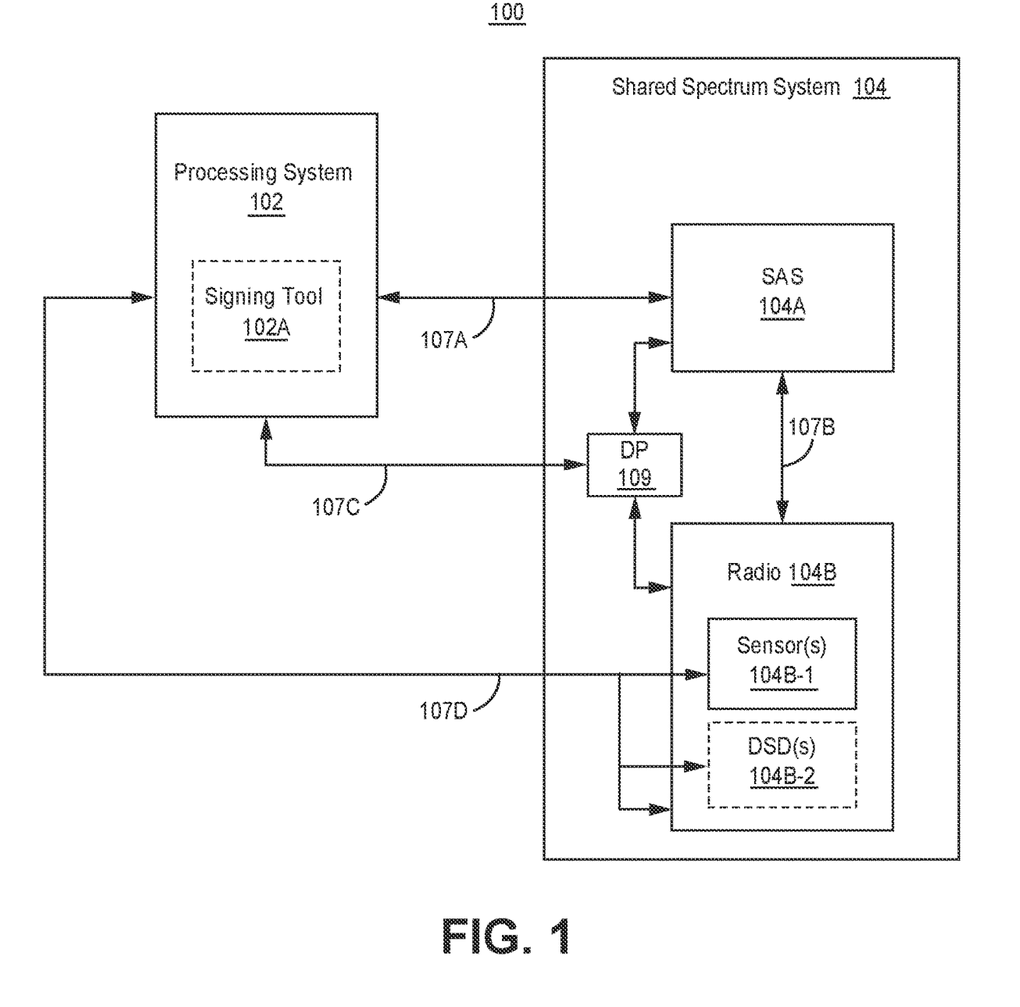
FIG. 1 illustrates a block diagram of one embodiment of a shared spectrum system comprising at least one radio configured to receive, from at least one sensor and/or at least one data storage device, data that includes radio parameter data and/or data that can be processed to generate radio parameter data.

FIG. 1 illustrates a block diagram of one embodiment of a shared spectrum system comprising at least one radio configured to receive, from at least one sensor and/or at least one data storage device (DSD), data that includes radio parameter data and/or data that can be processed to generate radio parameter data 100. The shared spectrum system 104 comprises a SAS (or SAS circuitry) 104A, and optionally at least one radio communicatively coupled to the SAS 104A. Further, optionally, the shared spectrum system 104 comprises a domain proxy processing system (or domain processing circuitry or DP) 109. A processing system 102 can be communicatively coupled to the SAS 104A and/or to the DP 109.

The optional DP 109 can be communicatively coupled to the SAS 104A and/or at least one radio; in FIG. 1, the DP 109 is illustrated for pedagogical reasons as being communicatively coupled to the radio 104B. The domain proxy processing system 109 may be implemented with state machine(s) and/or neural network(s). Optionally, the domain proxy processing system 109 may be implemented by processor circuitry coupled to memory circuitry. The domain proxy processing system 109 is configured to collect, and optionally aggregate, radio parameter data of one or more radios; the domain proxy processing system 109 is then configured to transmit the radio parameter data to the SAS 104A. The domain proxy processing system 109 may transmit the radio parameter data to the SAS 104A directly or through a radio access network (RAN) formed by radio(s) including the radio 104B. The domain proxy processing system 109 can be used to transmit the radio parameter data in lieu of or in addition to communicating radio parameter data to the SAS 104A from the processing system 102 through the first communications link 107A. Optionally, protocols (e.g., proprietary protocols such as message(s) sent by radios of the RAN (of which the radios are part) may be used to communicate the radio parameter data (for one or more radios) through the RAN, and then to the SAS 104A. Optionally, the domain proxy processing system 109 translates protocols of the RAN into protocol(s) of the SAS 104A. The domain proxy processing system 109 sends, optionally in at least one message, radio parameter data of one or more radios to the SAS 104A through the RAN, the Internet or packet gateway, and then the Internet, or directly through the Internet. If radio parameter data from more than one radio is aggregated by the domain proxy processing system 109, the aggregated data may be transmitted, e.g., in at least one message using the proprietary protocols, through the radio(s) of the RAN, and then to the SAS 104A. Optionally, the domain proxy processing system 109 is part of a radio access network including the radio 104B. Optionally, the domain proxy processing system 109 is coupled to the processing system 102 by a third communications link 107C. Data can be communicated between the processing system 102 and the domain proxy processing system 109 through the third communications link 107C.

Optionally, the processing system 102 is communicatively coupled to the shared spectrum system 104, e.g., the SAS 104A, by a first communications link 107A. The first communications link 107A can be used to communicate radio parameter data to the SAS 104A; alternatively, radio parameter data can be conveyed physically, e.g., with storage media, from the processing system 102 to the SAS 104A. Each of the communications links illustrated herein may comprise at least one wired connection and/or at least one wireless connection. Optionally, data may be transmitted from the processing system 102 to the SAS 104A through the first communications link 107A using a web page displayed on the processing system 102 accessed by a web browser (executed on the processing system 102) using an Internet protocol address of the SAS 104A; using the web page, data in the SAS 104A may be displayed, reviewed, revised, and/or entered. The SAS 104A is configured to regulate the radio as described elsewhere herein.

Each radio may comprise at least one sensor (sensor(s)) and/or at least one DSD (DSD(s)). FIG. 1 illustrates the radio 104B comprising sensor(s) 104B-1 and DSD(s) 104B-2. The at least one sensor (sensor(s)) 104B-1 may also be referred to as at least one sensor circuit (sensor circuit(s)). Each sensor measures data that is radio parameter data and/or data which can be processed to generate radio parameter data. The at least one data storage device (DSD(s)) 104B-2 may also be referred to as at least one data storage device circuit. Each DSD stores data that is radio parameter data and/or data which can be processed to generate radio parameter data.

The shared spectrum system 104 illustrated in FIG. 1 may also be referred to as a shared spectrum system with radio data collection because radio data is received (or collected) from the sensor(s) and/or DSD(s). Note, a radio 104B with sensor(s) 104B-1 and/or DSD(s) 104B-2 need not be part of the shared spectrum system 104 (e.g., registered with the SAS), but only be configured to operate under control of a SAS 104A of a shared spectrum system 104 to practice embodiments of the invention.

Optionally, the processing system 102 includes a signing tool 102A whose operation will be subsequently described.

Optionally, the signing tool 102A is stored in the memory circuitry and executed by the processor circuitry. Optionally, the signing tool 102A may be implemented by computer readable instructions executed by the processing system. The shared spectrum system 104 comprises a SAS 104A and at least one radio. Optionally, a second communications link 107B communicatively couples the radio 104B and the SAS 104A; thus, data can be communicated between the radio 104B and the SAS 104A through the second communications link 107B. Radio means a transmitter, or a transceiver, configured to be regulated by the SAS 104A, at least one antenna (antenna(s)) electrically coupled to the transmitter or the transceiver, and at least one of: sensor(s)) 104B-1 and DSD(s) 104B-2. Each data storage device includes memory (or memory circuitry).

Optionally, each sensor is mounted on or in an antenna, and/or each DSD is mounted on or in a corresponding radio such as on or in an antenna of the radio. If a radio includes two or more sensors, then each antenna may have at least one of sensor(s)) 104B-1 and DSD(s) 104B-2 mounted on or in the antenna. Optionally, the sensor(s) and/or the DSD(s) 104B-2 are coupled to the processing system 102 by communications link(s), which optionally may be a fourth communications link 107D and/or other communications link(s).

The DSD(s) 104B-2 may store data about radio 104B, e.g., antenna gain, antenna beam width, and/or antenna model. Antenna model means a manufacturer's part number of the corresponding antenna. Optionally, if DSD(s) 104B-2 provides antenna model, but do not provided corresponding antenna gain and/or antenna beam width, then the processing system 102 and/or SAS 104A can determine the antenna parameter data not provided (or unprovided antenna parameter data) using the provided antenna model. For example, upon receipt of an antenna model, the processing system 102 and/or the SAS 104A can determine the unprovided antenna parameter data from a database stored in the processing system 102, the SAS 104A, and/or an external system (e.g. server or cloud computing system) communicatively coupled to the processing system 102 and/or the SAS 104A.

Each of the sensor(s) 104B-1 and the data storage device(s) 104B-2 are optionally communicatively coupled to the processing system 102 by the fourth communications link 107D. Data measured by sensor(s) 104B-1 and/or provided by the DSD(s) 104B-2 is communicatively coupled to, and thus obtained by, the processing system 102 through the fourth communications link 107D. The fourth communications link 107D may comprise at least one wired connection and/or at least one wireless connection. Optionally, data measured by the sensor(s) 104B-1 and/or data provided by the DSD(s) 104B-2 may be communicated to the processing system using an antenna interface standards group (AISG) protocol, e.g., AISG v3.0, v2.1, v2.0, v1.1, and/or v1.1 protocols; however, alternative protocol(s) can be used. If an optional AISG protocol is used, then the radio parameter may optionally be communicated, at least in part, using an IEEE RS-485 standard compliant wired connection.

Optionally, the processing system 102 is coupled to the radio 104B by the fourth communications link 107D. Optionally, processing system 102 may display a web page accessed through the fourth communications link 107D by a web browser (executed by the processing system 102) using an internet protocol address of the radio 104B; using the web page, data in the radio 104B may thus be displayed, reviewed, entered, and/or revised with the processing system 102 with the web page. Thus, optionally, the processing system 102 is configured to transmit radio parameter data to the corresponding radio 104B through the fourth communications link 107D. The radio 104B can then subsequently communicate the radio parameter data to the SAS 104A, e.g., (a) through the RAN of which the radio 104B is a part, other components of the communication network of which the RAN is a part, and/or the Internet, (b) the domain proxy processing system 109, and/or the second communications link 107B.

The processing system 102 may optionally include at least one input/output (I/O) device (or at least one I/O circuit) and/or at least one communications system (or communications circuitry). Optionally, the I/O device and/or the communications system are coupled to the processor circuitry. The at least one I/O device may include a display, a touch screen, a keyboard, a mouse, a biometric sensor, memory card reader, and/or any other type of input device and/or output device to permit a user to review and/or enter data. The at least one communications system may include a modem and/or a radio, and facilitates communicatively coupling (by wired connection and/or wireless connection) the processing system 102 with the shared spectrum system 104, e.g., the SAS 104A and/or the radio 104B, and optionally to one or more other systems (other system(s)) such as processing system(s) including database(s), e.g., through the Internet. Such database(s) may include one or more of the databases referred to herein and used to obtain certain radio parameter data and/or other data.

The processing system 102 may be implemented with a state machine or a neural network. When the processing system 102 is a state machine, the processing system may comprise processor circuitry coupled to memory circuitry. The at least one I/O device and the at least one communications system are communicatively coupled to the state machine or neural network. Optionally, the processing system 102 may be a processing system in the corresponding radio whose radio parameter data is being determined, a cloud computing system, a server, a personal computer, a laptop, a tablet, a smart phone, or any other type of processing system.

For pedagogical purposes, the at least one radio is illustrated as a single radio 104B. However, a shared spectrum system 104 typically would include more than one radio whose transmission the SAS 104A is configured to control. Each radio includes a transmitter or a transceiver (configured to be regulated by the SAS 104A) and antenna(s) coupled thereto; however, a set of one or more (e.g., all) such radios include the sensor(s) 104B-1 and/or the DSD(s) 104B-2. Each radio of the shared spectrum system 104 may or may not include the same number of and type of sensor(s) 104B-1 and DSD(s) 104B-2 as are included in other radios configured to be controlled by the SAS 104A.

As discussed above, radio parameter data must be provided to a SAS 104A to permit the SAS 104A to determine whether the radio 104B should be permitted to transmit in shared spectrum, if so then at what power level and frequency, and whether a transmission of the radio 104B must cease when an incumbent user transmits in shared spectrum. Some or all radio parameter data are derived from data provided from sensor(s) 104B-1 and/or data obtained from the DSD(s) 104B-2. Some or all of the radio parameter data may be obtained directly from data provided from sensor(s) 104B-1 and/or from the DSD(s) 104B-2. Such data is transmitted from the sensor(s) 104B-1 and the DSD(s) 104B-2 to the processing system 102. Optionally, the processing system 102 may have to query a sensor or a DSD to obtain data therefrom. Optionally, some radio parameter data may not be obtainable from the sensors(s) 104B-1 and the DSD(s) 104B-2; thus, an installer of a radio or another person or system may have to enter such radio parameter data into the processing system 102 (e.g., through the at least one I/O device of the processing system 102 or by relaying such radio parameter data from another processing system to the processing system 102 by wired and/or wireless connections), into the corresponding radio, and/or the corresponding SAS 104A.

WInnForum Document WINNF-TS-0016 (version V1.2.3, entitled "Signaling Protocols and Procedures for Citizens Broadband Radio Service (CBRS): Spectrum Access System (SAS)—Citizens Broadband Radio Service Device (CBSD) Interface Technical Specification", dated Oct. 31, 2018) specifies CBSD parameter data (of a CBSD of a CBRS) to be entered by an installer which may also be referred to as a certified professional installer (CPI). Such CBSD or radio parameter data includes data for antenna horizontal (or lateral) position (or location) (e.g., optionally in latitude and longitude coordinates or other coordinates such as polar coordinates), antenna height including indicating if such height is measured relative to ground or sea level (e.g., mean sea level), whether the antenna is indoors or outdoors, antenna azimuth, antenna down tilt, antenna gain, antenna beam width, and CBSD (or radio) group identifier and group type. Antenna horizontal position (e.g., X and Y coordinate axes) and antenna height (or vertical position) above ground level (AGL) or above mean sea level (MSL) (e.g., Z coordinate axis) comprise antenna position. Also, such CBSD (or radio) parameter data may optionally include horizontal accuracy and/or vertical accuracy of CBSD antenna location or position, maximum CBSD (or radio) effective isotropic radiated power spectral density, and/or an antenna model (for example if an external antenna is used). The foregoing radio parameters (and corresponding data) are exemplary and a subset or a different set of radio parameters (and corresponding data) may be used. WInnForum Document WINNF-TS-0016 (version V1.2.3, entitled "Signaling Protocols and Procedures for Citizens Broadband Radio Service (CBRS): Spectrum Access System (SAS)—Citizens Broadband Radio Service Device (CBSD) Interface Technical Specification", dated Oct. 31, 2018) is incorporated herein by reference in its entirety.

Some of the parameter data (e.g., for antenna horizontal position, antenna height, antenna azimuth, and/or antenna down tilt) of a radio may be measured by sensor(s) 104B-1 of the radio 104B. For example, one or more of the sensor(s) 104B-1 may be used to determine:

(a) antenna height, e.g., using at least one global navigation satellite system (GNSS) receiver (GNSS receiver(s)), at least one laser range finder, at least one barometric altimeter, and/or at least one frequency modulated continuous wave radar or lidar;

(b) antenna horizontal position, e.g., using GNSS receiver(s);

(c) antenna azimuth, e.g., using at least one compass (compass(es)) and/or GNSS receiver(s). The compass(es) may include at least one magnetometer (magnetometer(s));

(d) antenna down tilt angle, e.g., using at least one inclinometer, at least one accelerometer, at least one gyroscope, and/or GNSS receiver(s); and/or (e) whether an antenna is indoors or outdoors, e.g., using at least one light sensor (light sensor(s) or light sensor circuit(s)). The following should be made during daylight hours when sunlight would be present. For example, the light sensor(s) may include filters to measure light intensity in two or more regions of the ultraviolet through infrared spectra. Light sensor(s)

may use filters to filter out all but desired light spectrum. The ratio of the light intensities in each region can be used to determine if the light is sunlight or light from a man-made light source. For example, the ratio of light intensity in a portion of infrared spectra and a portion of the blue spectra is about equal for sunlight but not typically for man-made light. Thus, if the ratio is not equal or within a range indicating sunlight, then manmade light is detected. Alternatively, sunlight is detected. However, the sunlight may be pass through a window into an interior of an enclosed structure, e.g. a building. If sunlight is detected, then the ratio of light intensity from 320 to 400 nm (UVA) can be compared to light intensity from 280 to 320 nm (UVB). Because UVB is blocked by typical window, this ratio can indicate whether sunlight is detected indoors or outdoors. A ratio of UVA to UVB that is above a certain threshold level would indicate that sunlight is detected indoors. The foregoing technique is exemplary, and other techniques can be used to discern whether the radio is indoors or outdoors. Alternatively, this radio parameter data can be provided by an installer.

The sensors illustrated above are exemplary. Other sensor(s) not identified may be used in addition to or in lieu of the sensors described above. Techniques for determining antenna azimuth, antenna tilt angle, and antenna lateral position and height are disclosed in U.S. Pat. Nos. 7,777,480, 8,018,390, and 10,396,426, and U.S. Patent Publication 20170357010; each U.S. patent and patent publication is incorporated by reference in its entirety herein.

Optionally, the GNSS receiver(s) may be used to determine antenna azimuth and/or antenna down tilt angle using interferometry. GNSS may include global positioning system (GPS), Globalnaya Navigazionnaya. Sputnikovaya Sistema (GLONASS), BeiDou navigation satellite system (BDS), and/or Galileo navigation satellite system.

Further, GNSS receivers typically do not measure height AGL or above MSL. However, the processing system 102 may access data, e.g., in a database, (e.g., in memory of the processing system 102 and/or in the memory of external system(s) (e.g. a remote server, and/or a cloud computing system) communicatively coupled to the processing system 102) that translates horizontal position to elevation in AGL and/or MSL. For example, such data may be accessed from the United States Geological Survey (USGS) or a similar government entity.

Optionally, if GNSS receiver(s) are used to determine horizontal position and/or height, the processing system 102 can derive the horizontal accuracy and/or the vertical accuracy of radio antenna location using parameter data from the GNSS receiver(s). Such data may optionally include User Equivalent Range Error (UERE), Horizontal Dilution of Precision (HDOP), and Vertical Dilution of Precision (VDOP) Horizontal accuracy can be determined by multiplying, e.g., UERE by HDOP. Vertical accuracy can be determined by multiplying, e.g., UERE by VDOP. Optionally, if more than one GNSS receiver is used, then parameter data can be averaged before determining corresponding accuracy.

The sensor(s) 104B-1 and/or DSD(s) 104B-2 may be discrete and/or part of a device (or circuitry) configured to measure more than one type of data, store more than one type of data, and/or measure and store more than one type of data. Optionally, an antenna can incorporate antenna orientation and location sensing circuitry configured to monitor antenna parameter data including antenna azimuth, antenna tilt angle, antenna roll angle, horizontal position, and elevation. Optionally, the antenna orientation and location sensing circuitry may include DSD(s), e.g., which store antenna parameters. Optionally, such antenna parameters include antenna model, antenna gain, and/or antenna beam width. Radio parameter data obtained directly or indirectly from the sensor(s) 104B-1 and/or the DSD(s) 104B-2 are subsequently conveyed directly or indirectly to the SAS 104A.

Figure 2:
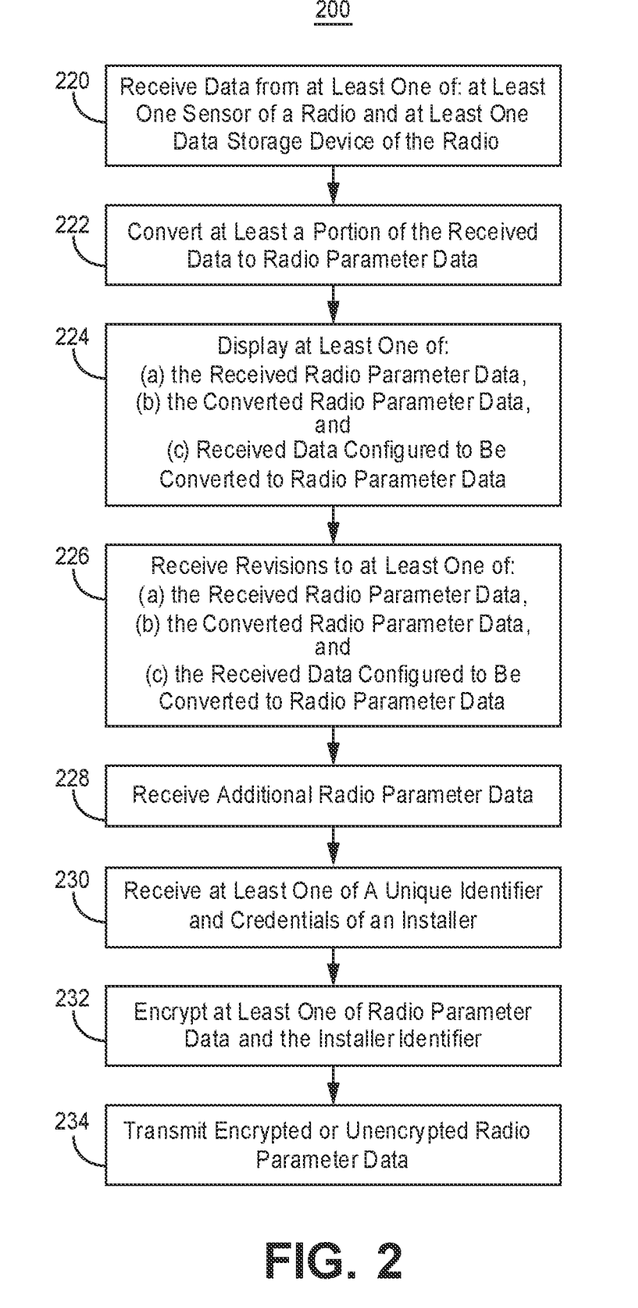
FIG. 2 illustrates a flow diagram of one embodiment of a method of providing radio parameter data to a spectrum access system.

FIG. 2 illustrates a flow diagram one embodiment of a method 200 of providing radio parameter data to a SAS. To the extent that the method 200 shown in FIG. 2 is described herein as being implemented with any of the systems illustrated herein, it is to be understood that other embodiments can be implemented in other ways. The blocks of the flow diagrams have been arranged in a generally sequential manner for ease of explanation; however, it is to be understood that this arrangement is merely exemplary, and it should be recognized that the processing associated with the methods (and the blocks shown in the FIG. 1) can occur in a different order (for example, where at least some of the processing associated with the blocks is performed in parallel and/or in an event-driven manner). The illustrated method may be executed by the processing system. Optionally all or part of the method may be executed by each of the processor circuitry, the at least one I/O device, and the at least one communications device. Optionally, the illustrated method may be stored as computer readable instructions in the memory circuitry.

In block 220, receive a first set of data from at least one of: at least one sensor of a radio and at least one data storage device of the radio. Optionally, the radio has been installed by an installer. Optionally, at least a portion of the first set of data is automatically received without intervention by a human, e.g., an installer, or other system(s). Automatic receipt may occur because the sensor(s) automatically transmitting determined or measured data and/or DSD(s) automatically transmit stored data; optionally, such transmission may be over the fourth communications link 107D. Optionally, at least a portion of the first set of data is received upon request. Optionally, a first portion may be automatically received and a second portion received upon request. Optionally, such request is issued by at least one of: a human, e.g., the installer, the processing system 102, and/or other system(s). The first set of data includes radio parameter data corresponding to the radio and/or data (measured by the at least one sensor and/or stored by the at least one DSD) which can be processed to determine radio parameter data corresponding to the radio. Optionally, the first set of data is received without human intervention, i.e., automatically.

Optionally, in block 222, convert at least a portion of the received first set of data to radio parameter data corresponding to the radio. Thus, optionally, the first set comprises radio parameter data configured to be processed to determine radio parameter data corresponding to the radio. Some examples are provided below. Optionally, convert at least one of: vertical distance, VDOP, and HDOP determined by a GNSS receiver to respectively to at least one of: vertical distance AGL or above MSL, vertical accuracy, and horizontal accuracy. Optionally, convert antenna identifier to the corresponding antenna gain, antenna beam width, and/or antenna model. Optionally, such at least a portion of the first set of received data is converted by the processing system 102 and/or at least one other processing system (e.g. at least one server and/or at least one cloud computing system).

Optionally, in block 224, display at least one of: (a) at least a portion of the received first set of radio parameter data, (b) at least a portion of the converted portion of the received first set of radio parameter data, and (c) at least a portion of the received first set of data configured to be converted to radio parameter data. Optionally, the installer, another person, the processing system 102, and/or another processing system reviews such displayed data. For example, the installer or the other person may use at least one I/O device (e.g., a display or touch screen) of the processing system 102 to review such displayed data.

Optionally, in block 226, receive revisions to at least one of: (a) at least a portion of the received first set of data, (b) the at least a portion of the converted portion of the received first set of data, and (c) the at least a portion of the received first set of data configured to be converted to radio parameter data. Optionally, such revisions are made by the installer, another person, the processing system 102, and/or another processing system. For example, the installer may use at least one I/O device (e.g., a touch screen, keyboard, and/or mouse) of the processing system 102 to revise all or a portion of such data. For example, the installer revises all or a portion of the displayed radio parameter data. Optionally such revisions are made to the displayed data.

Optionally, in block 228, receive a second set of data from a source other than the radio (e.g., the sensor(s) and/or DSD(s) of the radio) to which the second set of data corresponds. The second set of data comprises additional radio parameter data corresponding to the radio. Optionally, the second set of radio parameter data is entered by (and thus received from) the installer, another person, the processing system 102, and/or another processing system. For example, the installer may enter the second set of radio parameter data using at least one I/O device (e.g., a touch screen, keyboard, and/or mouse) of the processing system 102. Optionally, such second set of radio parameter data is data for radio parameter(s) which is not provided by, or cannot be derived from data provided by or stored in, the sensor(s) 104B-1 and the DSD(s) 104B-2; examples of such radio parameters include radio group identifier, radio group type, and maximum radio effective isotropic radiated power spectral density. Optionally, block 224 includes displaying all or a portion of the second set of radio parameter data.

Optionally, in certain circumstances, the SAS 104A must receive evidence that certain radio parameter data (e.g., at least a portion of the first set of radio parameter data, at least a portion of the converted portion of the received first set of radio parameter data, and/or at least a portion of the second set of radio parameter data) is received from and/or approved from a certified professional installer. Optionally, in block 230, receive at least one of a unique identifier (CPIR-ID) and credentials for use for encryption (e.g., a Certified Professional (CP) digital certificate and a CP digital certificate password) of a certified professional installer (CPI). A CPI may also be referred to herein more generally as an installer. Optionally, the at least one of a unique identifier (CPIR-ID) and credentials for use for encryption is received by the processing system 102. Alternatively, the at least one of a unique identifier (CPIR-ID) and credentials for use for encryption is received by the radio 104B prior to installation of the radio.

Because a shared spectrum system 104 can only operate efficiently and effectively if radio parameter data (e.g., the first set and/or the second set of radio parameter data) provided to the SAS 104A are accurate, U.S. Federal Regulation 47 C.F.R. § 96 requires that at least a certain type of CBSD (or radio) (higher power category B CBSDs or radios) be professionally installed. U.S. Federal Regulation 47 C.F.R. § 96 is incorporated herein by reference in its entirety. WInnForum Document WINNF-TS-0112 (version V1.6.0, entitled "Requirements for Commercial Operation in the U.S. 3550-3700 MHz Citizens Broadband Radio Service Band", dated Oct. 30, 2018) sets forth: (a) requirements for CPIs, (b) that each CPI be assigned a unique CPIR-ID, and (c) that CBSD (or radio) parameter data (or parameter data required to be entered by the CPI to register a valid CBSD (or radio) with a SAS 104A, otherwise known as "CPIDI") to be received by a SAS 104A are provided along with credentials of the a CPI, such as the CPIR-ID. (Thus, certain parameter data of a radio (e.g., at least a portion of the first set of radio parameter data, at least a portion of the converted portion of the received first set of radio parameter data, and/or at least a portion of the second set of radio parameter data) may also be referred to as CPIDI of a radio.) The CPI may also enter credentials, e.g., the CP digital certificate and the CP digital certificate password, in addition to the CPIR-ID. WInnForum Document WINNF-TS-0112 (version V1.6.0, entitled "Requirements for Commercial Operation in the U.S. 3550-3700 MHz Citizens Broadband Radio Service Band", dated Oct. 30, 2018) is incorporated herein by reference in its entirety.

Pursuant to the WInnForum standards, the CPIDI of a category B radio submitted to a SAS 104A must be signed (indicating approval by a submitting CPI) with the CPIR-ID and the credentials of the CPI. Optionally, encrypt at least one of the CPIDI and the CPIR-ID using the CP digital certificate and the CP digital certificate password, e.g., with the signing tool. Optionally, encryption may be implemented by computer readable instructions executed by the processing system 102. The signing tool may be used to encrypt at least one of the CPIDI and the CPIR-ID the CPIDI which are then provided to the corresponding radio or to an input interface of a domain proxy so that the encrypted CPIDI and the encrypted CPIR-ID can be provided to the SAS 104A. Optionally, the encrypted CPIDI and the encrypted CPIR-ID are communicated to a corresponding SAS 104A either by the radio during registration of the radio with the SAS 104A or by the domain proxy before or after such radio registration with the SAS 104A. In this optional embodiment, the SAS 104A may decrypt the encrypted CPIDI and the encrypted CPIR-ID, e.g., using at least one public key. Alternatively, the CPIDI and CPI credentials are separately provided by the CPI directly to the SAS 104A, e.g., through an interface of the SAS 104A. Both techniques require a CPI to submit radio parameter data to be communicated to a SAS 104A. Optionally, in block 232, encrypt at least one of: at least a portion of the first set of data, at least a portion of the converted portion of the received first set of data, and at least a portion of the second set of data.

In block 234, transmit a third set of data to at least one of: the radio to which the radio parameter data corresponds and spectrum access system circuitry, wherein the third set comprises at least one of: at least a portion of the first set, at least a portion of the second set, and at least a portion of the converted portion of the first set, wherein upon being transmitted to the radio, the third set is configured to be subsequently transmitted to the spectrum access system circuitry, and where the spectrum access system circuitry is configured to use the transmitted radio parameter data to control transmission of the radio to regulate interference in shared spectrum at an incumbent user which has priority in the shared spectrum over the radio. Optionally, at least a portion of the third set (e.g., at least a portion of the first set of data, at least a portion of the converted portion of the received first set of data, and/or at least a portion of the second set of data) is encrypted. Optionally, automatically perform such encryption using the at least one of a unique identifier (CPIR-ID) and credentials for use for encryption received by radio prior to installation of the radio.

The SAS 104A is configured to receive and use the transmitted third set of data described in block 234 above to at least determine the transmission power (in spectrum shared with an incumbent user) of each radio controlled by the SAS 104A and/or to determine if and when the radio (to which the transmitted radio parameter data corresponds) should cease transmission when an incumbent user transmits in the shared spectrum. The encrypted radio parameter data are decrypted by the SAS 104A, e.g., using a public key to verify that the radio parameter data was submitted by a certified professional installer.

Optionally, transmit the encrypted or unencrypted CPIR-ID to at least one of a SAS 104A and the radio to which the radio parameter data corresponds. The encrypted CPIR-ID is decrypted by the SAS 104A, e.g., using a public key.

Optionally, the radio parameter data (e.g., the encrypted at least one of a portion of the first set of radio parameter data, the encrypted at least a portion of the converted portion of the received first set of radio parameter data, and the encrypted at least a portion of the second set of radio parameter data, and an unencrypted at least one of another portion of the first set of radio parameter data, an unencrypted at least another portion of the converted portion of the received first set of radio parameter data, and an unencrypted at least another portion of the second set of radio parameter data is first transmitted to the radio to which the radio parameter data corresponds, and then the radio transmits the radio parameter data from the radio to the SAS 104A when the radio registers with the SAS 104A, or before or after such registration. Optionally, the radio parameter data is stored in the radio, e.g., in memory (or memory circuitry) (e.g., of a processing system) of the radio.

Optionally, the radio directly transmits through the Internet its radio parameter data to the SAS 104A. Optionally and alternatively, the radio 104B can indirectly transmit its radio parameter data to the SAS 104A through the radio access network, of which the radio is a part, to an Internet gateway or a packet gateway of a communications system (of which the RAN is a part). Transmissions of radios forming part of the shared spectrum system 104 are controlled by the SAS 104A. The SAS 104A also allocates spectrum and maximum transmission power to one or more radios of the shared spectrum system 104. Such a communications system (of which the RAN is a part) may be, e.g., a 4G and/or a 5G cellular network. The communications system is coupled by the Internet or the packet gateway to the SAS through the Internet or other communications link. A RAN facilitates communications between user equipment and another portion of the communication system, e.g., the Internet gateway or the packet gateway.

Alternatively, optionally, the radio parameter data may be communicated, e.g., from the processing system 102 to the SAS 104A through a domain proxy, rather than through the radio 104B. The domain proxy is an interface configured to collect, and optionally aggregate, radio parameter data of one or more radio; aggregation may be used when radio parameter data is collected for more than one radio. Thus, protocols, e.g., proprietary protocols such as message(s), of radios of the RAN may be used to communicate the radio parameter data, through the RAN, to the SAS 104A. The domain proxy sends, e.g., optionally in a message, a set of radio parameter data of one or more radios to the SAS 104A through the RAN, the Internet or packet gateway, and then the Internet as discussed above, or directly through the Internet. If aggregation of radio parameter data from more than one radio is utilized, the aggregated radio parameter data may be transmitted, e.g., in a single message of the proprietary protocol(s), through the radio(s) of the RAN, and then to the SAS 104A in the manner described herein.

Figure 3:
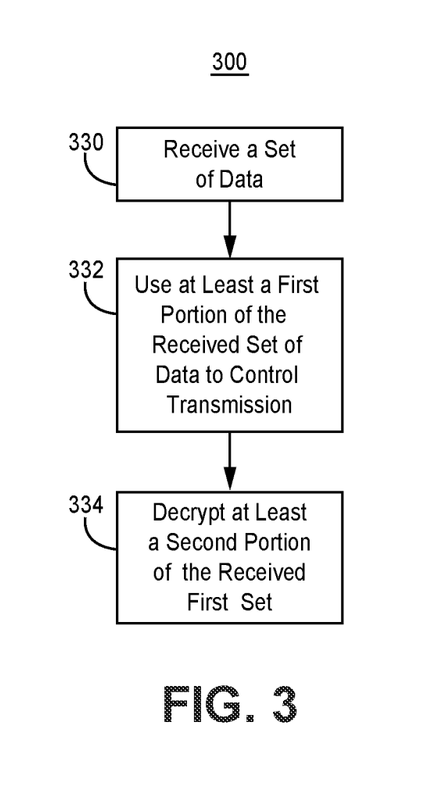
FIG. 3 illustrates a flow diagram of one embodiment of a method of processing radio parameter at a spectrum access system.

FIG. 3 illustrates a flow diagram of one embodiment of a method 300 of processing radio parameter at a SAS. To the extent that the method 300 shown in FIG. 3 is described herein as being implemented with any of the systems illustrated herein, it is to be understood that other embodiments can be implemented in other ways. The blocks of the flow diagrams have been arranged in a generally sequential manner for ease of explanation; however, it is to be understood that this arrangement is merely exemplary, and it should be recognized that the processing associated with the methods (and the blocks shown in the FIG. 1) can occur in a different order (for example, where at least some of the processing associated with the blocks is performed in parallel and/or in an event-driven manner). The illustrated method may be executed by the processing system. Optionally all or part of the method may be executed by each of the processor circuitry, the at least one I/O device, and the at least one communications device. Optionally, the illustrated method may be stored as computer readable instructions in the memory circuitry.

In block 330, receive, e.g., at the SAS 104A, a set of data, a set of data, wherein at least a first portion of the set of data is at least one of: (a) received from and (b) derived from data received from at least one of (i) at least one sensor of a radio and (ii) at least one data storage device of the radio, wherein the received set of data comprises radio parameter data corresponding to the radio, and wherein at least one of the received set of data (x) is automatically received and (y) is received upon request of the spectrum access system.

In block 332, use, e.g., at the SAS 104A, the at least a first portion of the received set of data to control transmission of the radio to regulate interference in shared spectrum at an incumbent user which has priority in the shared spectrum over the radio. Optionally, in block 334, decrypt (e.g., as illustrated herein), e.g., at the SAS 104A, at least a portion of the received set of data.

The processor circuitry described herein may include one or more microprocessors, microcontrollers, digital signal processing (DSP) elements, application-specific integrated circuits (ASICs), and/or field programmable gate arrays (FPGAs). In this exemplary embodiment, each processor circuit includes or functions with software programs, firmware, or other computer readable instructions for carrying out various process tasks, calculations, and control functions, used in the methods described herein. These instructions are typically tangibly embodied on any storage media (or computer readable medium) used for storage of computer readable instructions or data structures.

The memory circuitry described herein can be implemented with any available storage media (or computer readable medium) that can be accessed by a general purpose or special purpose computer or processor, or any programmable logic device. Suitable computer readable medium may include storage or memory media such as semiconductor, magnetic, and/or optical media. For example, computer readable media may include conventional hard disks, Compact Disk-Read Only Memory (CD-ROM), DVDs, volatile or non-volatile media such as Random Access Memory (RAM) (including, but not limited to, Dynamic Random Access Memory (DRAM)), Read Only Memory (ROM), Electrically Erasable Programmable ROM (EEPROM), and/ or flash memory. Combinations of the above are also included within the scope of computer readable media.

Methods of the invention can be implemented in computer readable instructions, such as program modules or applications, which may be stored in the computer readable medium that is part of (optionally the memory circuitry) or communicatively coupled to the processing circuitry, and executed by the processing circuitry, optionally the processor circuitry. Generally, program modules or applications include routines, programs, objects, data components, data structures, algorithms, and the like, which perform particular tasks or implement particular abstract data types.

Databases as used herein may be either conventional databases or data storage formats of any type, e.g., data files. Although separate databases are recited herein, one or more of such databases may be combined.

Exemplary Embodiments

Example 1 includes a program product comprising a non-transitory processor readable medium on which program instructions are embodied, wherein the program instructions are configured, when executed by at least one programmable processor, to cause the at least one programmable processor to: receive a first set of data from at least one of: at least one sensor of a radio and at least one data storage device of the radio, wherein the first set of data comprises radio parameter data corresponding to the radio, and wherein the first set of data is automatically received or is received upon request; receive a second set of data from a source other than the radio to which additional radio parameters correspond, wherein the second set of data comprises additional radio parameter data corresponding to the radio; and transmit a third set of data to at least one of: (a) the radio to which the radio parameter data corresponds and (b) spectrum access system circuitry, wherein the third set of data comprises at least one of: at least a portion of the first set of data and at least a portion of the second set of data, wherein upon being transmitted to the radio, the third set of data is configured to be subsequently transmitted to the spectrum access system circuitry configured to use the radio parameter data to control transmission of the radio to regulate interference in shared spectrum at an incumbent user which has priority in the shared spectrum over the radio.

Example 2 includes the program product of Example 1, wherein the program instructions are configured, when executed by at least one programmable processor, to further cause the at least one programmable processor to covert at least a portion of the first set of data to radio parameter data corresponding to the radio; and wherein the first set of data further comprises radio parameter data configured to be processed to determine radio parameter data corresponding to the radio; wherein the third set of data comprises at least a portion of a converted portion of the first set of data.

Example 3 includes the program product of any of Examples 1-2, wherein the program instructions are configured, when executed by at least one programmable processor, to further cause the at least one programmable processor to receive revisions to at least one of: (a) at least a portion of the first set of data and (b) at least a portion of the second set of data.

Example 4 includes the program product of any of Examples 1-3, wherein the program instructions are configured, when executed by at least one programmable processor, to further cause the at least one programmable processor to receive at least one of a unique identifier of an installer and credentials of the installer for use for encryption.

Example 5 includes the program product of Example 4, wherein the program instructions are configured, when executed by at least one programmable processor, to further cause the at least one programmable processor upon receiving credentials for encryption, to encrypt at least one of: at least a portion of the first set of data, at least a portion of a converted portion of the first set of data, and at least a portion of the second set of data; wherein the third set of data comprises encrypted data.

Example 6 includes a method, comprising: receiving a first set of data from at least one of: at least one sensor of a radio and at least one data storage device of the radio, wherein the first set of data comprises radio parameter data corresponding to the radio, and wherein the first set of data is automatically received or is received upon request; receiving a second set of data from a source other than the radio to which additional radio parameters correspond, wherein the second set of data comprises additional radio parameter data corresponding to the radio; and transmitting a third set of data to at least one of: (a) the radio to which the radio parameter data corresponds and (b) spectrum access system circuitry, wherein the third set of data comprises at least one of: at least a portion of the first set of data and at least a portion of the second set of data, wherein upon being transmitted to the radio, the third set of data is configured to be subsequently transmitted to the spectrum access system circuitry configured to use the radio parameter data to control transmission of the radio to regulate interference in shared spectrum at an incumbent user which has priority in the shared spectrum over the radio.

Example 7 includes the method of Example 6, further comprising to converting at least a portion of the first set of data to radio parameter data corresponding to the radio; and wherein the first set of data further comprises radio parameter data configured to be processed to determine radio parameter data corresponding to the radio; wherein the third set of data comprises at least a portion of a converted portion of the first set of data.

Example 8 includes the method of any of Examples 6-7, further comprising receiving revisions to at least one of: (a) at least a portion of the first set of data and (b) at least a portion of the second set of data.

Example 9 includes the method of any of Examples 6-8, further comprising receiving at least one of a unique identifier of an installer and credentials of the installer for use for encryption.

Example 10 includes the method of Example 9, further comprising, upon receiving credentials for encryption, encrypting at least one of: at least a portion of the first set of data, at least a portion of a converted portion of the first set of data, and at least a portion of the second set of data; wherein the third set of data comprises encrypted data.

Example 11 includes an apparatus, comprising: processing circuitry; wherein the processing circuitry is configured to: receive a first set of data from at least one of: at least one sensor of a radio and at least one data storage device of the radio, wherein the first set of data comprises radio parameter data corresponding to the radio, and wherein the first set of data is automatically received or is received upon request; receive a second set of data from a source other than the radio to which additional radio parameters correspond, wherein the second set of data comprises additional radio parameter data corresponding to the radio; and transmit a third set of data to at least one of: (a) the radio to which the radio parameter data corresponds and (b) spectrum access system circuitry, wherein the third set of data comprises at least one of: at least a portion of the first set of data and at least a portion of the second set of data, wherein upon being transmitted to the radio, the third set of data is configured to be subsequently transmitted to the spectrum access system circuitry configured to use the radio parameter data to control transmission of the radio to regulate interference in shared spectrum at an incumbent user which has priority in the shared spectrum over the radio.

Example 12 includes the apparatus of Example 11, wherein the processing circuitry is further configured to covert at least a portion of the first set of data to radio parameter data corresponding to the radio; and wherein the first set of data further comprises radio parameter data configured to be processed to determine radio parameter data corresponding to the radio; wherein the third set of data comprises at least a portion of a converted portion of the first set of data.

Example 13 includes the apparatus of any of Examples 11-12, further comprising at least one input/output (I/O) circuit.

Example 14 includes the apparatus of Example 13, wherein the processing circuitry is further configured to receive, through the at least one I/O circuit, revisions to at least one of: (a) at least a portion of the first set of data and (b) at least a portion of the second set of data.

Example 15 includes the apparatus of any of Examples 13-14, wherein the processing circuitry is further configured to receive, through the at least one I/O circuit, at least one of a unique identifier of an installer and credentials of the installer for use for encryption.

Example 16 includes the apparatus of Example 15, wherein the processing circuitry is further configured, upon receiving credentials for encryption, to encrypt at least one of: at least a portion of the first set of data, at least a portion of a converted portion of the first set of data, and at least a portion of the second set of data; wherein the third set of data comprises encrypted data.

Example 17 includes the apparatus of any of Examples 13-16, wherein the at least one I/O circuit comprises at least one of a display, a touch screen, a keyboard, a mouse, and a biometric sensor.

Example 18 includes a program product comprising a non-transitory processor readable medium on which program instructions are embodied, wherein the program instructions are configured, when executed by at least one programmable processor, to cause the at least one programmable processor to: receive, at a spectrum access system, a set of data, wherein at least a first portion of the set of data is at least one of: (a) received from and (b) derived from data received from at least one of (i) at least one sensor of a radio and (ii) at least one data storage device of the radio, wherein the set of data comprises radio parameter data corresponding to the radio, and wherein at least one of the set of data (x) is automatically received and (y) is received upon request of the spectrum access system; and use, at a spectrum access system, the at least a first portion of the set of data to control transmission of the radio to regulate interference in shared spectrum at an incumbent user which has priority in the shared spectrum over the radio.

Example 19 includes the program product of Example 18, wherein the program instructions are configured, when executed by at least one programmable processor, to further cause the at least one programmable processor to decrypt, at a spectrum access system, at least a second portion of the set of data.

Example 20 includes a method, comprising: receiving, at a spectrum access system, a set of data, wherein at least a first portion of the set of data is at least one of: (a) received from and (b) derived from data received from at least one of (i) at least one sensor of a radio and (ii) at least one data storage device of the radio, wherein the set of data comprises radio parameter data corresponding to the radio, and wherein at least one of the set of data (x) is automatically received and (y) is received upon request of the spectrum access system; and using the at least a first portion of the set of data to control transmission of the radio to regulate interference in shared spectrum at an incumbent user which has priority in the shared spectrum over the radio.

Example 21 includes the method of Example 20, further comprising decrypting at least a second portion of the set of data.

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

The invention claimed is:

1. A program product comprising a non-transitory processor readable medium on which program instructions are embodied, wherein the program instructions are configured, when executed by at least one programmable processor, to cause the at least one programmable processor to:
receive a first set of data from at least one of: at least one sensor of a radio and at least one data storage device of the radio, wherein the first set of data comprises radio parameter data corresponding to the radio, and wherein the first set of data is automatically received or is received upon request;
receive a second set of data from a source other than the radio to which additional radio parameters correspond, wherein the second set of data comprises additional radio parameter data corresponding to the radio; and
transmit a third set of data to at least one of: (a) the radio to which the radio parameter data corresponds and (b) spectrum access system circuitry, wherein the third set of data comprises at least one of: at least a portion of the first set of data and at least a portion of the second set of data, wherein upon being transmitted to the radio, the third set of data is configured to be subsequently transmitted to the spectrum access system circuitry configured to use the radio parameter data to control transmission of the radio to regulate interference in shared spectrum at an incumbent user which has priority in the shared spectrum over the radio.

2. The program product of claim 1, wherein the program instructions are configured, when executed by the at least one programmable processor, to further cause the at least one programmable processor to covert at least a portion of the first set of data to other radio parameter data corresponding to the radio; and
wherein the first set of data further comprises the radio parameter data configured to be processed to determine the other radio parameter data corresponding to the radio;
wherein the third set of data comprises at least a portion of a converted portion of the first set of data.

3. The program product of claim 1, wherein the program instructions are configured, when executed by the at least one programmable processor, to further cause the at least one programmable processor to receive revisions to the at least one of: (a) at least a portion of the first set of data and (b) at least a portion of the second set of data.

4. The program product of claim 1, wherein the program instructions are configured, when executed by the at least one programmable processor, to further cause the at least one programmable processor to receive at least one of a unique identifier of an installer and credentials of the installer for use for encryption.

5. The program product of claim 4, wherein the program instructions are configured, when executed by the at least one programmable processor, to further cause the at least one programmable processor upon receiving the credentials for encryption, to encrypt at least one of: the at least a portion of the first set of data, the at least a portion of a converted portion of the first set of data, and the at least a portion of the second set of data;

wherein the third set of data comprises encrypted data.

6. A method, comprising:
receiving a first set of data from at least one of: at least one sensor of a radio and at least one data storage device of the radio, wherein the first set of data comprises radio parameter data corresponding to the radio, and wherein the first set of data is automatically received or is received upon request;
receiving a second set of data from a source other than the radio to which additional radio parameters correspond, wherein the second set of data comprises additional radio parameter data corresponding to the radio; and
transmitting a third set of data to at least one of: (a) the radio to which the radio parameter data corresponds and (b) spectrum access system circuitry, wherein the third set of data comprises at least one of: at least a portion of the first set of data and at least a portion of the second set of data, wherein upon being transmitted to the radio, the third set of data is configured to be subsequently transmitted to the spectrum access system circuitry configured to use the radio parameter data to control transmission of the radio to regulate interference in shared spectrum at an incumbent user which has priority in the shared spectrum over the radio.

7. The method of claim 6, further comprising to converting at least a portion of the first set of data to other radio parameter data corresponding to the radio; and
wherein the first set of data further comprises the radio parameter data configured to be processed to determine the other radio parameter data corresponding to the radio;
wherein the third set of data comprises at least a portion of a converted portion of the first set of data.

8. The method of claim 6, further comprising receiving revisions to the at least one of: (a) at least a portion of the first set of data and (b) at least a portion of the second set of data.

9. The method of claim 6, further comprising receiving at least one of a unique identifier of an installer and credentials of the installer for use for encryption.

10. The method of claim 9, further comprising, upon receiving the credentials for encryption, encrypting at least one of: the at least a portion of the first set of data, the at least a portion of a converted portion of the first set of data, and the at least a portion of the second set of data;
wherein the third set of data comprises encrypted data.

11. An apparatus, comprising:
processing circuitry;
wherein the processing circuitry is configured to:
receive a first set of data from at least one of: at least one sensor of a radio and at least one data storage device of the radio, wherein the first set of data comprises radio parameter data corresponding to the radio, and wherein the first set of data is automatically received or is received upon request;
receive a second set of data from a source other than the radio to which additional radio parameters correspond, wherein the second set of data comprises additional radio parameter data corresponding to the radio; and
transmit a third set of data to at least one of: (a) the radio to which the radio parameter data corresponds and (b) spectrum access system circuitry, wherein the third set of data comprises at least one of: at least a portion of the first set of data and at least a portion of the second set of data, wherein upon being transmitted to the radio, the third set of data is configured to be subsequently transmitted to the spectrum access system circuitry configured to use the radio parameter data to control transmission of the radio to regulate interference in shared spectrum at an incumbent user which has priority in the shared spectrum over the radio.

12. The apparatus of claim 11, wherein the processing circuitry is further configured to covert at least a portion of the first set of data to other radio parameter data corresponding to the radio; and
wherein the first set of data further comprises the radio parameter data configured to be processed to determine the other radio parameter data corresponding to the radio;
wherein the third set of data comprises at least a portion of a converted portion of the first set of data.

13. The apparatus of claim 11, further comprising at least one input/output (I/O) circuit.

14. The apparatus of claim 13, wherein the processing circuitry is further configured to receive, through the at least one I/O circuit, revisions to the at least one of: (a) at least a portion of the first set of data and (b) at least a portion of the second set of data.

15. The apparatus of claim 13, wherein the processing circuitry is further configured to receive, through the at least one I/O circuit, at least one of a unique identifier of an installer and credentials of the installer for use for encryption.

16. The apparatus of claim 15, wherein the processing circuitry is further configured, upon receiving the credentials for encryption, to encrypt at least one of: the at least a portion of the first set of data, the at least a portion of a converted portion of the first set of data, and the at least a portion of the second set of data;
wherein the third set of data comprises encrypted data.

17. The apparatus of claim 13, wherein the at least one I/O circuit comprises at least one of a display, a touch screen, a keyboard, a mouse, and a biometric sensor.

* * * * *